(12) United States Patent
Suzuki et al.

(10) Patent No.: US 9,720,593 B2
(45) Date of Patent: Aug. 1, 2017

(54) TOUCH PANEL OPERATION DEVICE AND OPERATION EVENT DETERMINATION METHOD IN TOUCH PANEL OPERATION DEVICE

(71) Applicant: DENSO CORPORATION, Kariya, Aichi-pref. (JP)

(72) Inventors: Yasunori Suzuki, Chiryu (JP); Naoki Satou, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 9 days.

(21) Appl. No.: 14/772,752

(22) PCT Filed: Feb. 6, 2014

(86) PCT No.: PCT/JP2014/000635
§ 371 (c)(1),
(2) Date: Sep. 3, 2015

(87) PCT Pub. No.: WO2014/136380
PCT Pub. Date: Sep. 12, 2014

(65) Prior Publication Data
US 2016/0004424 A1  Jan. 7, 2016

(30) Foreign Application Priority Data

Mar. 4, 2013 (JP) .................. 2013-041906

(51) Int. Cl.
*G06F 3/0481* (2013.01)
*G06F 3/0488* (2013.01)
(Continued)

(52) U.S. Cl.
CPC ........ *G06F 3/04883* (2013.01); *G06F 3/0412* (2013.01); *G06F 3/0416* (2013.01);
(Continued)

(58) Field of Classification Search
CPC .. G06F 3/04883; G06F 3/0412; G06F 3/0416; G06F 3/0486; G06F 3/0481; G06F 2203/04808; G06F 2203/04104
See application file for complete search history.

(56) References Cited

U.S. PATENT DOCUMENTS

2010/0252700 A1* 10/2010 Wang .................. F16B 47/00
248/206.2
2011/0224897 A1* 9/2011 Tan .................... G01C 21/3664
701/532
(Continued)

FOREIGN PATENT DOCUMENTS

CN   102411446 A   4/2012
CN   102739873 A   10/2012
(Continued)

OTHER PUBLICATIONS

International Search Report and Written Opinion (in Japanese with English Translation) for PCT/JP2014/000635, mailed May 13, 2014; ISA/JP.

*Primary Examiner* — Christopher E Leiby
(74) *Attorney, Agent, or Firm* — Harness, Dickey & Pierce, P.L.C.

(57) ABSTRACT

A touch panel operation device recognizes multiple kinds of operation events with respect to a touch panel with sufficient assurance and effectively restricts execution of processing not intended by a user. A gesture microcomputer detects a user's gesture with respect to a touch panel and notifies an HMI application of an operation signal corresponding to the detection. The HMI application determines an operation event from the operation signal notified by the gesture microcomputer. The notification is received in such a way that a present state of the touch panel is judged and the determination is made based on variation of the state and the like by monitoring the state.

9 Claims, 14 Drawing Sheets

(51) Int. Cl.
*G06F 3/041* (2006.01)
*G06F 3/0486* (2013.01)

(52) U.S. Cl.
CPC .......... *G06F 3/0481* (2013.01); *G06F 3/0486* (2013.01); *G06F 2203/04104* (2013.01); *G06F 2203/04808* (2013.01)

(56) References Cited

U.S. PATENT DOCUMENTS

| | | |
|---|---|---|
| 2012/0068945 A1 | 3/2012 | Sugeda et al. |
| 2012/0069056 A1 | 3/2012 | Ito |
| 2012/0146929 A1 | 6/2012 | Oyama |
| 2012/0254804 A1* | 10/2012 | Sheha ................ G06Q 30/02 715/834 |
| 2013/0070065 A1 | 3/2013 | Shimotani et al. |
| 2013/0326429 A1* | 12/2013 | Barak ................ G06F 3/04883 715/863 |
| 2014/0019912 A1 | 1/2014 | Zhang et al. |
| 2014/0327640 A1 | 11/2014 | Oyama |
| 2014/0327805 A1 | 11/2014 | Oyama |

FOREIGN PATENT DOCUMENTS

| | | |
|---|---|---|
| JP | 2002311820 A | 10/2002 |
| JP | 2007052637 A | 3/2007 |
| JP | 2010049469 A | 3/2010 |
| JP | 2010079488 A | 4/2010 |
| JP | 2011039990 A | 2/2011 |
| JP | 2012064092 A | 3/2012 |
| JP | 5102894 B1 | 12/2012 |
| WO | WO-2012053032 A1 | 4/2012 |
| WO | WO-2013031516 A1 | 3/2013 |

\* cited by examiner

FIG. 3

| PRESENT STATE \ EVENT | | A |
|---|---|---|
| S1 | [Condition] | –                                              (1) |
|    | [MapOperation] | – |
|    | [Action] | ACTIVATE TIMER 1 (LONG PRESSING DETERMINATION) STORE TOUCH COORDINATES 1 |
|    | [NextState] | STATE 2 (GESTURE WAITING) |
| S2 | [Condition] | – |
|    | [MapOperation] | – |
|    | [Action] | – |
|    | [NextState] | – |
| S3 | [Condition] | – |
|    | [MapOperation] | – |
|    | [Action] | – |
|    | [NextState] | – |
| S4 | [Condition] | –                                             (26) |
|    | [MapOperation] | CANCEL FLICK SCROLL |
|    | [Action] | – |
|    | [NextState] | – |
| S5 | [Condition] | – |
|    | [MapOperation] | – |
|    | [Action] | – |
|    | [NextState] | – |
| S6 | [Condition] | – |
|    | [MapOperation] | –                                             (33) |
|    | [Action] | STORE TOUCH COORDINATES 2 |
|    | [NextState] | – |
| S7 | [Condition] | – |
|    | [MapOperation] | – |
|    | [Action] | – |
|    | [NextState] | – |
| S8 | [Condition] | – |
|    | [MapOperation] | – |
|    | [Action] | – |
|    | [NextState] | – |

FIG. 4

| | | B |
|---|---|---|
| S1 | [Condition] | – |
| | [MapOperation] | – |
| | [Action] | – |
| | [NextState] | – |
| S2 | [Condition] | –                              (5) |
| | [MapOperation] | – |
| | [Action] | CANCEL TIMER 1 (LONG PRESSING DETERMINATION) AND ACTIVATE TIMER 2 (DOUBLE-TAP DETERMINATION) |
| | [NextState] | STATE 6 (DOUBLE-TAP WAITING) |
| S3 | [Condition] | – |
| | [MapOperation] | – |
| | [Action] | –                              (20) |
| | [NextState] | STATE 1 (NO OPERATION STATE) |
| S4 | [Condition] | – |
| | [MapOperation] | – |
| | [Action] | – |
| | [NextState] | – |
| S5 | [Condition] | – |
| | [MapOperation] | STOP CONTINUOUS SCROLLING      (29) |
| | [Action] | – |
| | [NextState] | STATE 1 (NO OPERATION STATE) |
| S6 | [Condition] | –                              (34) |
| | [MapOperation] | ONE-TOUCH SCROLL TO POINT OF TOUCH COORDINATES 2 |
| | [Action] | CANCEL TIMER 2 (DOUBLE-TAP DETERMINATION) WHEN TIMER 2 IS ACTIVATED |
| | [NextState] | STATE 1 (NO OPERATION STATE) |
| S7 | [Condition] | – |
| | [MapOperation] | –                              (38) |
| | [Action] | – |
| | [NextState] | STATE 1 (NO OPERATION STATE) |
| S8 | [Condition] | – |
| | [MapOperation] | –                              (43) |
| | [Action] | – |
| | [NextState] | STATE 1 (NO OPERATION STATE) |

FIG. 5

| | | C | |
|---|---|---|---|
| S1 | [Condition] | – | |
| | [MapOperation] | – | |
| | [Action] | – | |
| | [NextState] | – | |
| S2 | [Condition] | IN NON-CONSTRAINED MODE AS WELL AS WHEN MOVING AMOUNT IS X-DOT OR MORE AND WHEN TWO FINGERS ARE NOT TOUCHED (6) | IN CONSTRAINED MODE AS WELL AS WHEN MOVING AMOUNT IS X-DOT OR MORE AND WHEN TWO FINGERS ARE NOT TOUCHED (7) |
| | [MapOperation] | DRAG SCROLL | HALF SCROLL TO TRACING DIRECTION |
| | [Action] | CANCEL TIMER 1 (LONG PRESSING DETERMINATION) | CANCEL TIMER 1 (LONG PRESSING DETERMINATION) |
| | [NextState] | STATE 3 (DRAG SCROLL STATE) | STATE 1 (NO OPERATION STATE) |
| S3 | [Condition] | IN NON-CONSTRAINED MODE | IN CONSTRAINED MODE |
| | [MapOperation] | DRAG SCROLL | HALF SCROLL TO TRACING DIRECTION |
| | [Action] | – (21) | – (22) |
| | [NextState] | – | STATE 1 (NO OPERATION STATE) |
| S4 | [Condition] | – | |
| | [MapOperation] | – | |
| | [Action] | – | |
| | [NextState] | – | |
| S5 | [Condition] | IN NON-CONSTRAINED MODE (30) | IN CONSTRAINED MODE (31) |
| | [MapOperation] | CONTINUOUS SCROLL BASED ON NEW COORDINATES (NO OPERATION WHEN COORDINATES ARE THE SAME) | ONE-TOUCH SCROLL |
| | [Action] | – | – |
| | [NextState] | – | STATE 1 (NO OPERATION STATE) |
| S6 | [Condition] | – | |
| | [MapOperation] | – | |
| | [Action] | – | |
| | [NextState] | – | |
| S7 | [Condition] | – | |
| | [MapOperation] | – | |
| | [Action] | – | |
| | [NextState] | – | |
| S8 | [Condition] | – | |
| | [MapOperation] | – | |
| | [Action] | – | |
| | [NextState] | – | |

FIG. 6

| | | D | |
|---|---|---|---|
| S1 | [Condition] | IN NON-CONSTRAINED MODE AND MOVING AMOUNT IS X-DOT OR MORE (2) | IN CONSTRAINED MODE (3) |
| | [MapOperation] | FLICK SCROLL | - |
| | [Action] | CANCEL TIMER 1 (LONG PRESSING DETERMINATION) | - |
| | [NextState] | STATE 4 (FLICK OPERATION STATE) | - |
| S2 | [Condition] | WHEN MOVING AMOUNT IS X-DOT OR MORE AND TWO FINGERS ARE NOT TOUCHED (8) | IN CONSTRAINED MODE AS WELL AS WHEN MOVING AMOUNT IS X-DOT OR MORE AND TWO FINGERS ARE NOT TOUCHED (9) |
| | [MapOperation] | FLICK SCROLL | HALF SCROLL IN FLICK DIRECTION |
| | [Action] | CANCEL TIMER (LONG PRESSING DETERMINATION) | CANCEL TIMER 1 (LONG PRESSING DETERMINATION) |
| | [NextState] | STATE 4 (FLICK OPERATION STATE) | STATE 1 (NO OPERATION STATE) |
| S3 | [Condition] | - | |
| | [MapOperation] | FLICK SCROLL (23) | (24) |
| | [Action] | WHEN FLICK SCROLL SUCCEEDS, STATE MAKES TRANSITION TO NEXT STATE | WHEN FLICK SCROLL DOES NOT SUCCEED, STATE MAKES TRANSITION TO NEXT STATE |
| | [NextState] | STATE 4 (FLICK OPERATION STATE) | STATE 1 (NO OPERATION STATE) |
| S4 | [Condition] | - | |
| | [MapOperation] | - | |
| | [Action] | - | |
| | [NextState] | - | |
| S5 | [Condition] | - | |
| | [MapOperation] | - | |
| | [Action] | - | |
| | [NextState] | - | |
| S6 | [Condition] | - | |
| | [MapOperation] | - | |
| | [Action] | - | |
| | [NextState] | - | |
| S7 | [Condition] | - | |
| | [MapOperation] | - | |
| | [Action] | - | |
| | [NextState] | - | |
| S8 | [Condition] | - | |
| | [MapOperation] | - | |
| | [Action] | - | |
| | [NextState] | - | |

FIG. 7

| | | E |
|---|---|---|
| S1 | [Condition] | – |
| | [MapOperation] | – |
| | [Action] | – |
| | [NextState] | – |
| S2 | [Condition] | – |
| | [MapOperation] | – |
| | [Action] | – |
| | [NextState] | – |
| S3 | [Condition] | – |
| | [MapOperation] | – |
| | [Action] | – |
| | [NextState] | – |
| S4 | [Condition] | –                              (27) |
| | [MapOperation] | – |
| | [Action] | – |
| | [NextState] | STATE 1 (NO OPERATION STATE) |
| S5 | [Condition] | – |
| | [MapOperation] | – |
| | [Action] | – |
| | [NextState] | – |
| S6 | [Condition] | – |
| | [MapOperation] | – |
| | [Action] | – |
| | [NextState] | – |
| S7 | [Condition] | – |
| | [MapOperation] | – |
| | [Action] | – |
| | [NextState] | – |
| S8 | [Condition] | – |
| | [MapOperation] | – |
| | [Action] | – |
| | [NextState] | – |

FIG. 8

| | | F |
|---|---|---|
| S1 | [Condition] | − |
| | [MapOperation] | − |
| | [Action] | − |
| | [NextState] | − |
| S2 | [Condition] | − |
| | [MapOperation] | − |
| | [Action] | − |
| | [NextState] | − |
| S3 | [Condition] | − |
| | [MapOperation] | − |
| | [Action] | − |
| | [NextState] | − |
| S4 | [Condition] | − |
| | [MapOperation] | − |
| | [Action] | − |
| | [NextState] | − |
| S5 | [Condition] | − |
| | [MapOperation] | − |
| | [Action] | − |
| | [NextState] | − |
| S6 | [Condition] | −  (35) |
| | [MapOperation] | CHANGE (EXPAND) SCALE |
| | [Action] | CANCEL TIMER 2 (DOUBLE TAP DETERMINATION) |
| | [NextState] | STATE 1 (NO OPERATION STATE) |
| S7 | [Condition] | − |
| | [MapOperation] | − |
| | [Action] | − |
| | [NextState] | − |
| S8 | [Condition] | − |
| | [MapOperation] | − |
| | [Action] | − |
| | [NextState] | − |

FIG. 9

| | | G |
|---|---|---|
| S1 | [Condition] | – |
| | [MapOperation] | – |
| | [Action] | – |
| | [NextState] | – |
| S2 | [Condition] | – |
| | [MapOperation] | – |
| | [Action] | – |
| | [NextState] | – |
| S3 | [Condition] | – |
| | [MapOperation] | – |
| | [Action] | – |
| | [NextState] | – |
| S4 | [Condition] | – |
| | [MapOperation] | – |
| | [Action] | – |
| | [NextState] | – |
| S5 | [Condition] | – |
| | [MapOperation] | – |
| | [Action] | – |
| | [NextState] | – |
| S6 | [Condition] | –                                (36) |
| | [MapOperation] | CHANGE (CONTRACT) SCALE |
| | [Action] | CANCEL TIMER 2 (DOUBLE TAP DETERMINATION) |
| | [NextState] | STATE 1 (NO OPERATION STATE) |
| S7 | [Condition] | – |
| | [MapOperation] | – |
| | [Action] | – |
| | [NextState] | – |
| S8 | [Condition] | – |
| | [MapOperation] | – |
| | [Action] | – |
| | [NextState] | – |

FIG. 10

| | | H | | |
|---|---|---|---|---|
| S1 | [Condition] | - | | |
| | [MapOperation] | - | | |
| | [Action] | - | | |
| | [NextState] | - | | |
| S2 | [Condition] | IN NON-CONSTRAINED MODE AND MOVING AMOUNT IS X-DOT OR MORE OR INTEGRATED MOVING AMOUNT IS Z-DOT OR MORE (10) | IN NON-CONSTRAINED MODE AND MOVING AMOUNT IS Y-DOT OR LESS (11) | IN CONSTRAINED MODE (12) |
| | [MapOperation] | CHANGE (EXPAND) SCALE | - | - |
| | [Action] | CANCEL TIMER 1 (LONG PRESSING DETERMINATION) | CANCEL TIMER 1 (LONG PRESSING DETERMINATION) INTEGRATE MOVING AMOUNT | - |
| | [NextState] | STATE 7 (PINCH-IN/OUT STATE) | - | - |
| S3 | [Condition] | - | | |
| | [MapOperation] | - | | |
| | [Action] | - | | |
| | [NextState] | - | | |
| S4 | [Condition] | - | | |
| | [MapOperation] | - | | |
| | [Action] | - | | |
| | [NextState] | - | | |
| S5 | [Condition] | - | | |
| | [MapOperation] | - | | |
| | [Action] | - | | |
| | [NextState] | - | | |
| S6 | [Condition] | - | | |
| | [MapOperation] | - | | |
| | [Action] | - | | |
| | [NextState] | - | | |
| S7 | [Condition] | IN NON-CONSTRAINED MODE (39) | IN CONSTRAINED MODE (40) | |
| | [MapOperation] | CHANGE (EXPAND) SCALE | - | |
| | [Action] | - | - | |
| | [NextState] | - | STATE 1 (NO OPERATION STATE) | |
| S8 | [Condition] | - | | |
| | [MapOperation] | - | | |
| | [Action] | - | | |
| | [NextState] | - | | |

FIG. 11

| | | I | | |
|---|---|---|---|---|
| S1 | [Condition] | - | | |
| | [MapOperation] | - | | |
| | [Action] | - | | |
| | [NextState] | - | | |
| S2 | [Condition] | MOVING AMOUNT IS Y-DOT OR MORE OR INTEGRATED MOVING AMOUNT IS Z-DOT OR MORE (13) | MOVING AMOUNT IS Y-DOT OR LESS (14) | IN CONSTRAINED MODE (15) |
| | [MapOperation] | CHANGE (CONTRACT) SCALE | - | - |
| | [Action] | CANCEL TIMER 1 (LONG PRESSING DETERMINATION) | CANCEL TIMER 1 (LONG PRESSING DETERMINATION) INTEGRATE MOVING AMOUNT | - |
| | [NextState] | STATE 7 (PINCH-IN/OUT STATE) | - | - |
| S3 | [Condition] | - | | |
| | [MapOperation] | - | | |
| | [Action] | - | | |
| | [NextState] | - | | |
| S4 | [Condition] | - | | |
| | [MapOperation] | - | | |
| | [Action] | - | | |
| | [NextState] | - | | |
| S5 | [Condition] | - | | |
| | [MapOperation] | - | | |
| | [Action] | - | | |
| | [NextState] | - | | |
| S6 | [Condition] | - | | |
| | [MapOperation] | - | | |
| | [Action] | - | | |
| | [NextState] | - | | |
| S7 | [Condition] | IN NON-CONSTRAINED MODE (41) | IN CONSTRAINED MODE (42) | |
| | [MapOperation] | CHANGE (CONTRACT) SCALE | - | |
| | [Action] | - | - | |
| | [NextState] | - | STATE 1 (NO OPERATION STATE) | |
| S8 | [Condition] | - | | |
| | [MapOperation] | - | | |
| | [Action] | - | | |
| | [NextState] | - | | |

FIG. 12

| | | J | |
|---|---|---|---|
| S1 | [Condition] | – | |
| | [MapOperation] | – | |
| | [Action] | – | |
| | [NextState] | – | |
| S2 | [Condition] | (3D DIP ANGLE ADJUSTMENT SCREEN) AS WELL AS (MOVING AMOUNT IS A-DOT OR MORE, OR INTEGRATED MOVING AMOUNT IS B-DOT OR MORE) (16) | MOVING AMOUNT IS A-DOT OR LESS (17) |
| | [MapOperation] | ADJUST 3D DIP ANGLE | – |
| | [Action] | CANCEL TIMER 1 (LONG PRESSING DETERMINATION) | CANCEL TIMER 1 (LONG PRESSING DETERMINATION) INTEGRATE MOVING AMOUNT |
| | [NextState] | STATE 8 (SWIPE OPERATION STATE) | – |
| S3 | [Condition] | – | |
| | [MapOperation] | – | |
| | [Action] | – | |
| | [NextState] | – | |
| S4 | [Condition] | – | |
| | [MapOperation] | – | |
| | [Action] | – | |
| | [NextState] | – | |
| S5 | [Condition] | – | |
| | [MapOperation] | – | |
| | [Action] | – | |
| | [NextState] | – | |
| S6 | [Condition] | – | |
| | [MapOperation] | – | |
| | [Action] | – | |
| | [NextState] | – | |
| S7 | [Condition] | – | |
| | [MapOperation] | – | |
| | [Action] | – | |
| | [NextState] | – | |
| S8 | [Condition] | – | (44) |
| | [MapOperation] | ADJUST 3D DIP ANGLE | |
| | [Action] | – | |
| | [NextState] | – | |

FIG. 13

|  |  | K |  | L |  |
|---|---|---|---|---|---|
| S1 | [Condition] | - | [Condition] | - |
|  | [MapOperation] | - | [MapOperation] | - |
|  | [Action] | - | [Action] | - |
|  | [NextState] | - | [NextState] | - |
| S2 | [Condition] | - | [Condition] | - |
|  | [MapOperation] | - | [MapOperation] | - |
|  | [Action] | - | [Action] | - |
|  | [NextState] | - | [NextState] | - |
| S3 | [Condition] | - | [Condition] | - |
|  | [MapOperation] | -                              (25) | [MapOperation] | - |
|  | [Action] | - | [Action] | - |
|  | [NextState] | STATE 1 (NO OPERATION) | [NextState] | - |
| S4 | [Condition] | - | [Condition] | - |
|  | [MapOperation] | CANCEL FLICK (28) | [MapOperation] | - |
|  | [Action] | - | [Action] | - |
|  | [NextState] | STATE 1 (NO OPERATION) | [NextState] | - |
| S5 | [Condition] | - | [Condition] | - |
|  | [MapOperation] | - | [MapOperation] | - |
|  | [Action] | - | [Action] | - |
|  | [NextState] | - | [NextState] | - |
| S6 | [Condition] | - | [Condition] | - |
|  | [MapOperation] | - | [MapOperation] | - |
|  | [Action] | - | [Action] | - |
|  | [NextState] | - | [NextState] | - |
| S7 | [Condition] | - | [Condition] | - |
|  | [MapOperation] | - | [MapOperation] | - |
|  | [Action] | - | [Action] | - |
|  | [NextState] | - | [NextState] | - |
| S8 | [Condition] | - | [Condition] | - |
|  | [MapOperation] | - | [MapOperation] | - |
|  | [Action] | - | [Action] | - |
|  | [NextState] | - | [NextState] | - |

FIG. 14

| | | M | |
|---|---|---|---|
| s1 | [Condition] | - | (4) |
| | [MapOperation] | - | |
| | [Action] | CANCEL TIMER 1 (LONG PRESSING DETERMINATION) | |
| | [NextState] | - | |
| s2 | [Condition] | IN NON-CONSTRAINED MODE AS WELL AS WHEN TWO FINGERS ARE NOT TOUCHED (8) | IN CONSTRAINED MODE AS WELL AS WHEN TWO FINGERS ARE NOT TOUCHED (9) |
| | [MapOperation] | CONTINUOUS SCROLL | ONE-TOUCH SCROLL |
| | [Action] | CANCEL TIMER 1 (LONG PRESSING DETERMINATION) | CANCEL TIMER 1 (LONG PRESSING DETERMINATION) |
| | [NextState] | STATE 5 (CONTINUOUS SCROLL OPERATION STATE) | STATE 1 (NO OPERATION) |
| s3 | [Condition] | - | |
| | [MapOperation] | - | |
| | [Action] | - | |
| | [NextState] | - | |
| s4 | [Condition] | - | |
| | [MapOperation] | - | |
| | [Action] | - | |
| | [NextState] | - | |
| s5 | [Condition] | - | (32) |
| | [MapOperation] | - | |
| | [Action] | CANCEL TIMER 1 (LONG PRESSING DETERMINATION) | |
| | [NextState] | - | |
| s6 | [Condition] | - | |
| | [MapOperation] | - | |
| | [Action] | - | |
| | [NextState] | - | |
| s7 | [Condition] | - | |
| | [MapOperation] | - | |
| | [Action] | - | |
| | [NextState] | - | |
| s8 | [Condition] | - | |
| | [MapOperation] | - | |
| | [Action] | - | |
| | [NextState] | - | |

FIG. 15

| | | N |
|---|---|---|
| s1 | [Condition] | - |
| | [MapOperation] | - |
| | [Action] | - |
| | [NextState] | - |
| s2 | [Condition] | - |
| | [MapOperation] | - |
| | [Action] | - |
| | [NextState] | - |
| s3 | [Condition] | - |
| | [MapOperation] | - |
| | [Action] | - |
| | [NextState] | - |
| s4 | [Condition] | - |
| | [MapOperation] | - |
| | [Action] | - |
| | [NextState] | - |
| s5 | [Condition] | - |
| | [MapOperation] | - |
| | [Action] | |
| | [NextState] | - |
| s6 | [Condition] | - (37) |
| | [MapOperation] | ONE-TOUCH SCROLL TO POINT OF TOUCH COORDINATES 1 |
| | [Action] | CANCEL TIMER 2 (DOUBLE TAP DETERMINATION) |
| | [NextState] | STATE 1 (NO OPERATION) |
| s7 | [Condition] | - |
| | [MapOperation] | - |
| | [Action] | - |
| | [NextState] | - |
| s8 | [Condition] | - |
| | [MapOperation] | - |
| | [Action] | - |
| | [NextState] | - |

TOUCH PANEL OPERATION DEVICE AND OPERATION EVENT DETERMINATION METHOD IN TOUCH PANEL OPERATION DEVICE

CROSS REFERENCE TO RELATED APPLICATIONS

This application is a U.S. National Phase Application under 35 U.S.C. 371 of International Application No. PCT/JP2014/000635 filed on Feb. 6, 2014 and published in Japanese as WO 2014/136380 A1 on Sep. 12, 2014. This application is based on and claims the benefit of priority from Japanese Patent Application No. 2013-041906 filed on Mar. 4, 2013. The entire disclosures of all of the above applications are incorporated herein by reference.

TECHNICAL FIELD

The present disclosure relates to a touch panel operation device capable of inputting multiple kinds of operation events according to gestures performed by a user using a finger or a touch pen on a touch panel, and an operation event determination method in the touch panel operation device.

BACKGROUND ART

For example, an in-vehicle navigation apparatus includes a touch panel on a screen of a display device on which, for example, a map is displayed, in which scrolling of the map, the change of a scale and the like are controlled by performing touch operations on the touch panel by a user's finger. In this case, operations executed by the user include multiple kinds of emotional (sensory) gesture operations such as a flick operation, pinch-in/out operations, a drag operation and a double-tap operation. The touch panel operation device includes a gesture microcomputer which detects an operation event inputted to the touch panel, and a display controller performs display control corresponding to the detected operation event in accordance with the notification from the gesture microcomputer.

In the above case, a technique of confirming the gesture operations on the touch panel such as tapping, dragging and double tapping by determining a change in the amount of sensation and the existence of a movement of an article on the touch panel is disclosed in, for example, PTL 1. According to the technique, misjudgment due to noise judgment is restricted and a fault that it is difficult to recognize the operation on the touch panel due to an unclear action in the operation is improved, thereby improving convenience for use.

PRIOR ART LITERATURE

Patent Literature

PTL 1: JP2007-52637A

SUMMARY OF INVENTION

In related art, the gesture microcomputer is not configured to perform exclusive control when detecting multiple operation events, and these operation events may be notified almost at the same timing. For example, there is a case where an event operated by two fingers and an event operated by single finger are generated (ignited) and notified at the same time while the user performs operation using two fingers. There is also a case where an operation event of double tapping is ignited (notified) after an operation event of tapping is ignited (notified) when the user performs the gesture operation of double tapping.

In the case where multiple operation events are notified almost at the same time as described above, the gesture operation of the user may be incorrectly recognized and the display controller may perform an incorrect operation, that is, the display controller may execute processing (display control) not intended by the user. In fact, countermeasures for restricting the above incorrect recognition have not been sufficiently taken in related-art techniques such as PTL 1.

The present disclosure has been made in view of the above, and an object thereof is to provide a touch panel operation device and an operation event determination method in the touch panel operation device, which are capable of recognizing multiple kinds of operation events with respect to the touch panel with sufficient assurance and capable of effectively restricting execution of processing not intended by the user.

According to embodiment first aspect of the present disclosure, there is provided a touch panel operation device capable of inputting multiple kinds of operation events according to gestures performed by a user using a finger or a touch pen on a touch panel, and executing control corresponding to the operation event with respect to an operation target. The touch panel operation device includes a gesture microcomputer detecting a gesture including touch on/off with respect to the touch panel and a position thereof to output an operation signal, and a determination unit determining the operation event from the operation signal notified by the gesture microcomputer. The determination unit judges a present state of the touch panel from the operation signal and determines the operation event by monitoring variation of the state.

According to a second aspect of the present disclosure, there is provided an operation event determination method for determining an operation event in a touch panel operation device which includes a touch panel on which multiple kinds of operation events can be inputted according to gestures performed by a user using a finger or a touch pen, a gesture microcomputer detecting a gesture including touch on/off with respect to the touch panel and a position thereof to output an operation signal, and a determination unit determining the operation event from the operation signal notified from the gesture microcomputer, and which performs control corresponding to the operation event with respect to an operation target. The operation event determination method includes judging a present state of the touch panel from the operation signal notified by the gesture microcomputer, and determining the operation event by monitoring variation of the state.

According to the above configuration, when a gesture of the user is made with respect to the touch panel, the gesture microcomputer detects the gesture and notifies the determination unit of the operation signal corresponding to the detection. The determination unit determines the operation event from the operation signal notified by the gesture microcomputer. The notification is received in such a way that the present state of the touch panel is judged and the determination is made based on variation of the state and the like by monitoring the state. The management of the state can effectively exclude the operation event which has been notified by the user unintentionally and enables determination of the operation event intended by the user.

Consequently, multiple kinds of operation events with respect to the touch panel can be recognized with sufficient assurance and the execution of processing not intended by the user can be effectively restricted. In the present disclosure, the function of the determination unit is not imparted to the gesture microcomputer but can be realized by the software configuration (application software) on the controller's side which performs control of the operation target. Accordingly, system design and adjustment, alternation and improvement of operational specification and the like can be accomplished on software without changing the gesture microcomputer, thereby obtaining an advantage that the adjustment, alternations and the like can be performed easily.

BRIEF DESCRIPTION OF DRAWINGS

The above and other objects, features and advantages of the present disclosure will become more apparent from the following detailed description made with reference to the accompanying drawings, in which:

FIG. 3 is a diagram showing the contents of control in determination processing of an HMI application and map display (No. 1);

FIG. 4 is a diagram showing the contents of control in determination processing of the HMI application and map display (No. 2);

FIG. 5 is a diagram showing the contents of control in determination processing of the HMI application and map display (No. 3);

FIG. 6 is a diagram showing the contents of control in determination processing of the HMI application and map display (No. 4);

FIG. 7 is a diagram showing the contents of control in determination processing of the HMI application and map display (No. 5);

FIG. 8 is a diagram showing the contents of control in determination processing of the HMI application and map display (No. 6);

FIG. 9 is a diagram showing the contents of control in determination processing of the HMI application and map display (No. 7);

FIG. 10 is a diagram showing the contents of control in determination processing of the HMI application and map display (No. 8);

FIG. 11 is a diagram showing the contents of control in determination processing of the HMI application and map display (No. 9);

FIG. 12 is a diagram showing the contents of control in determination processing of the HMI application and map display (No. 10);

FIG. 13 is a diagram showing the contents of control in determination processing of the HMI application and map display (No. 11);

FIG. 14 is a diagram showing the contents of control in determination processing of the HMI application and map display (No. 12); and FIG. 15 is a diagram showing the contents of control in determination processing of the HMI application and map display (No. 13).

DESCRIPTION OF EMBODIMENTS

Figure 1:
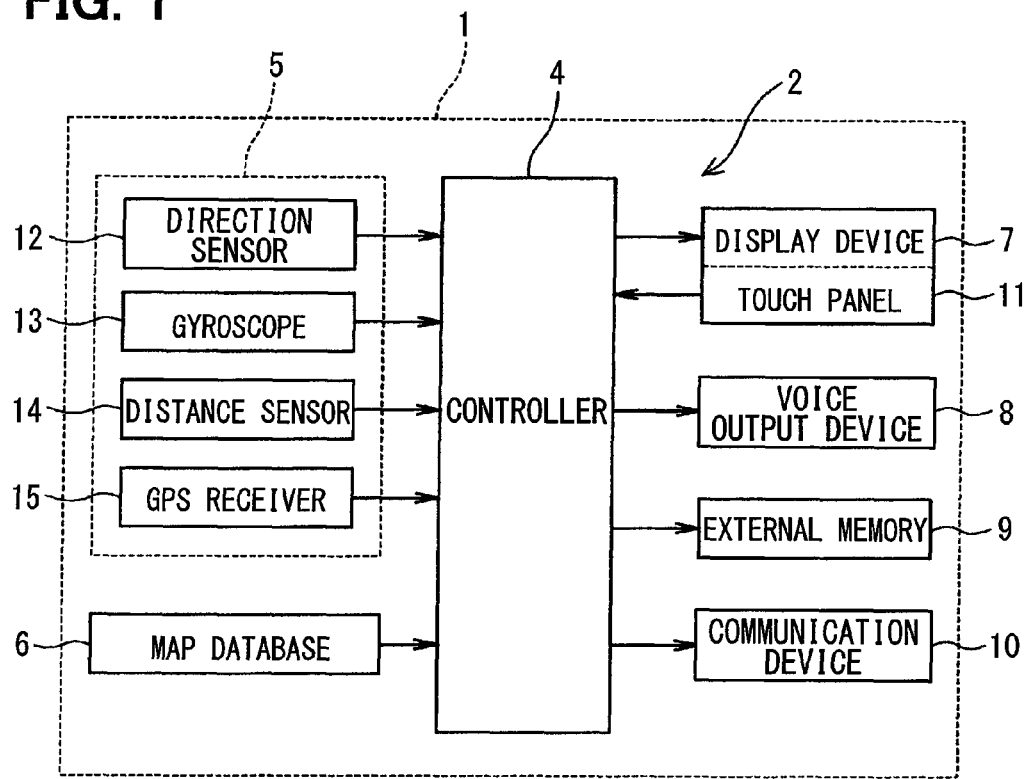
FIG. 1 is a diagram schematically showing a hardware configuration of a car navigation system according to an embodiment of the present disclosure.

Hereinafter, an embodiment in which the present disclosure is applied to, for example, a car navigation system mounted on a vehicle (motor vehicle) will be explained with reference to the drawings. FIG. 1 schematically shows a hardware configuration of a car navigation system 1. The car navigation system 1 includes a map display device 2 as an operation target and a touch panel operation device 3 (see FIG. 2) according to the present embodiment.

As shown in FIG. 1, the car navigation system 1 includes a controller (navigation ECU) 4, and further includes a position detection section 5, a map database 6, a display device 7, a speech output device 8, an external memory 9, a communication device 10 and the like, which are connected to the controller 4. A later-described touch panel 11 is provided on a surface part of the display device 7. The controller 4 is constituted mainly by a computer including a CPU, a ROM and a RAM and the like. The controller 4 controls the entire car navigation system 1 in accordance with programs stored in the ROM and the like.

The position detection section 5 is provided with a direction sensor 12 detecting a direction of a vehicle, a gyro sensor 13 detecting a turning angle of the vehicle and a distance sensor 14 detecting a travelling distance of the vehicle, which are estimating a vehicle position by self-contained navigation. Additionally, a GPS receiver 15 receiving transmission waves from an artificial satellite for a GPS (Global Positioning System) for measuring a vehicle position by a radio navigation is included. The controller 4 detects a current position (absolute position), a travelling direction, a velocity, a travelling distance, a current time and the like of the own vehicle based on the input from respective sensors 12 to 15 included in the position detection section 5.

The map database 6 stores, for example, a road map data of the whole of Japan, destination data such as various facilities and stores associated the map data, map matching data and the like, which functions as a map data acquisition unit. The road map data is configured by a road network in which roads on the map are represented by lines, which is given by link data in which the map is divided into plural parts by using intersections, junctions and the like as nodes, and parts between respective nodes are prescribed as links. The link data is configured by including data such as link IDs (identifiers), link lengths, position data (longitudes, latitudes) of start points and end points (nodes) of links, angle (direction) data, road widths, road types and road attributes. In addition, data for reproducing (drawing) the road map on the screen of the display device 7 is also included.

The display device 7 is formed of a liquid crystal display and the like, for example, which can perform color display, and for example, a menu screen or a map screen and the like used when using the navigation function are displayed on the screen thereof. In this case, the controller 4 controls the map display of the display device 7 based on the position of the own vehicle detected by the position detection section 5 and map data of the map database 6. Therefore, the map display device 2 is configured by the display device 7, the controller 4, the map database 6 and the like. The speech output device 8 is configured by including a speaker and the like, outputting music, guidance voice and the like. The communication device 10 transmits/receives data between the communication device 10 and an external information center through, for example, Internet and the like.

According to the above, the navigation system 1 (controller 4) executes navigation processing such as a location function which displays the detected position of the own vehicle on the screen of the display device 7 with the road map, a route guidance function which searches an adequate route to a destination designated by the user and guides the route and other functions as it is well known. The search of the route is performed by using, for example, well-known Dijkstra's algorithm. The route guidance is performed by outputting a necessary guidance voice by the speech output device 8 with the screen display of the display device 7.

Figure 2:
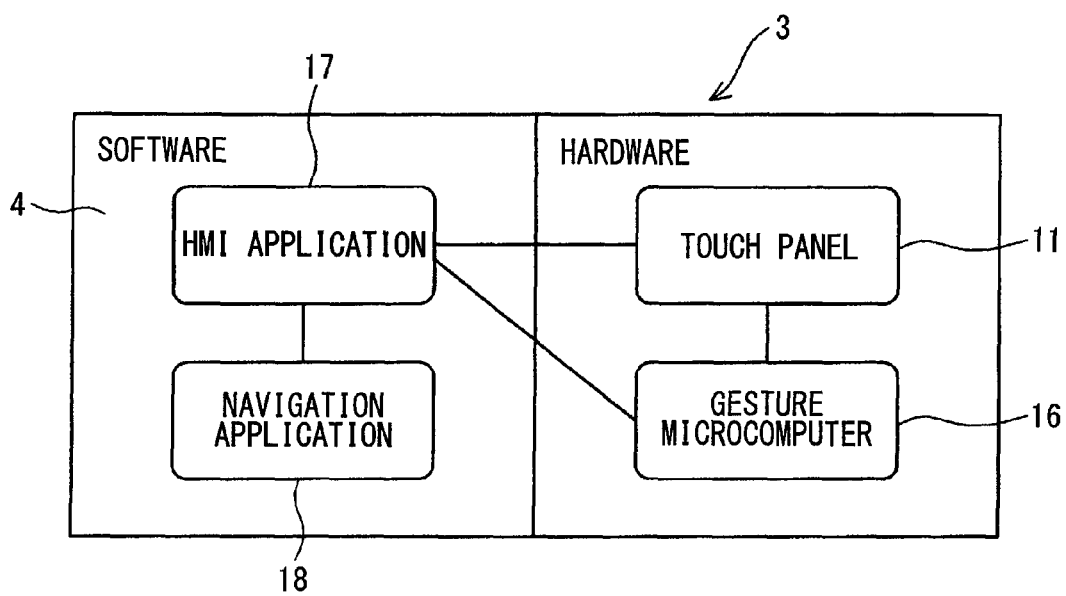
FIG. 2 is a diagram showing a configuration of a touch panel operation device.

As shown in FIG. 2, the touch panel operation device 3 according to the embodiment includes, as a hardware configuration, the touch panel 11 provided on the screen of the display device 7 and a gesture microcomputer 16 connected to the touch panel 11 and detecting a touch position thereof. The touch panel operation device 3 further includes an HMI application 17 as a determination unit and a navigation application 18 as a control unit, which are realized by the software configuration of the controller 4 (execution of the display control program).

The touch panel 11 has a well-known structure in which a multiple number of wiring lines are provided on a transparent film in an X-axis direction and a Y-axis direction respectively through a spacer, which is configured to detect a touch position (two-dimensional coordinates) where the user performed touch operation by using a finger (or a touch pen and the like). Both a resistance film system and an electrostatic capacitance system can be applied as a detection system. The user can input multiple kinds of operation events by executing the gesture on the touch panel 11.

In this case, the multiple kinds of operation events include, for example, dragging (an operation of shifting a finger (single finger) touching the screen in one direction), flicking (an operation of moving the finger touching the screen in a flicking manner), a tapping operation (an operation of touching (tapping) the screen by single finger once), double-tapping (an operation of touching (tapping) the screen twice continuously), pinching-out (an operation of moving two fingers touching the screen so as to separate), pinching-in (an operation of moving two fingers touching the screen so as to approach), a swiping (an operation of dragging (or flicking) on the screen by two fingers) and the like.

The gesture microcomputer 16 detects an operation event (gesture) including touch on/off executed by the user with respect to the touch panel 1 as well as a position, a direction, a moving amount and the like, notifying the HMI application 17 of the controller 4 of an operation signal. The HMI application 17 functions as a determination unit determining the operation event based on the operation signal notified from the gesture microcomputer 16. The navigation application 18 controls the map display with respect to the display device 7 in accordance with the operation event determined by the HMI application 17.

As an example of the map display executed by the navigation application 18, for example, the following control (operation) will be executed in the embodiment. That is, when the dragging operation is performed as the operation event, drag scroll (movement of the map) is executed. When the flick operation is performed, flick scroll is executed. When the double-tap operation is performed, the scale is changed. When the pinch-in and pinch-out operation are performed, the scale of the map is changed, that is, expansion and contraction are respectively performed. When the swipe operation is performed, a dip angle in three-dimensional (3D) display of the map is changed.

In the above case, when the HMI application 17 determines the operation event based on the notification from the gesture microcomputer 16, the HMI application 17 is configured to judge a present state of the touch panel 11 from the operation signal notified from the gesture microcomputer 16 and determine the operation event by monitoring variation of the state, which will be described in the following explanation of functions in detail.

More specifically, the HMI application 17 is in a gesture waiting state when the operation signal indicating the first touch-on is notified from the gesture microcomputer 16 in a state where no operation is performed on the touch panel 11, then, the HMI application 17 determines the gesture of the operation signal notified from the gesture microcomputer 16 first is determined as the operation event intended by the user. The gesture microcomputer 16 notifies the operation signal of touch-on at the timing where the first finger touches even when the gesture microcomputer 16 detects the touch-on at multiple positions in a short period of time. The gesture microcomputer 16 notifies an operation signal of touch-off when all fingers are separated from the touch panel.

The HMI application 17 determines that the operation event is the drag operation on condition that the moving amount of the touch position is a predetermined amount (x-dot) or more when the operation signal of the drag operation is notified from the gesture microcomputer 16. The HMI application 17 also determines that the operation event is the flick operation on condition that the moving amount of the touch position is a predetermined amount (x-dot) or more when the operation signal of the flick operation is notified from the gesture microcomputer 16.

In addition, when an operation signal of touch-off is notified from the gesture microcomputer 16 after the operation signal of the first touch-on, the HMI application 17 sets a timer period T2 and determines that the operation event is the double-tap operation on condition that the operation signal of the double-tap operation is notified from the gesture microcomputer 16 within the timer period T2. Furthermore, when an operation signal of two-finger operation is notified from the microcomputer 16, the HMI application 17 makes a determination by giving priority to the operation event of two-finger operation over the operation event of single-finger operation.

In the embodiment, a signal indicating whether the vehicle travels or not is inputted to the controller 4 (HMI application 17) from the vehicle side, and various types of operations of the touch panel 11 can be executed when the vehicle stops (in a non-constrained mode). On the other hand, when the vehicle travels (in a constrained mode), part of operations on the touch panel 11 is not received, namely, the operation on the touch panel 11 is restricted.

Next, functions of the above structure will be explained also with reference to FIG. 3 to FIG. 15. FIG. 3 to FIG. 15 are diagrams showing operation events determined by the controller 4 (HMI application 17) and the contents of control in map display (condition, map operation, action and next state (stage)) executed by the navigation application 18 in accordance with the operation events in a tabular list. Although FIG. 3 to FIG. 15 are originally one continuous diagram, the diagram is separately shown as 14 diagrams (No. 1 to No. 13) for want of space. In FIG. 3 to FIG. 15, operation signals (A to N) notified from the gesture microcomputer 16 are aligned in a horizontal direction and present states (S1 to S8) of the touch panel 11 are aligned in a vertical direction.

In this case, the operation signals notified from the gesture microcomputer 16 include "A: touch-on operation notification", "B: touch-off operation notification", "C: drag operation notification", "D: flick operation notification", "E: momentum scrolling stop notification", "F: double-tap operation notification", "G: two-finger double tap operation notification", "H: pinch-out operation notification", "I:

pinch-in operation notification", "J: swipe operation notification", "K: constrained mode notification", "L: constrained mode cancel notification", "M: timer T1 (long pressing determination) count" and "N: timer T2 (double-tap determination) ignition count".

On the other hand, the present states of the touch panel 11 includes "state S1: no operation state (default state at the time of cancelling the constrained mode)", "state S2: gesture waiting state", "state S3: drag scroll state", "state S4: flick scroll state", "state S5: continuous scroll operation state", "state S6: double-tap waiting state", "state S7: pinch-in/out state" and "state S8: swipe state".

Hereinafter, respective processing shown in FIG. 3 to FIG. 15 will be sequentially described.

When the touch-on operation notification (A) is made in the no operation state (state S1) in FIG. 3, a timer T1 for determining long pressing is activated and touch coordinates 1 are stored, then, the process proceeds to the state S2 (gesture waiting state) (processing (1)). When the flick operation notification (D) is made in the no operation state (state S1) in FIG. 6, the flick scroll is executed on condition that the moving amount is x-dot or more in the non-constrained mode. The timer T1 is cancelled and the process proceeds the state S4 (flick scroll state) (processing (2)). The processing is not executed in the constrained mode (processing (3)). When the timer T1 count notification (M) is made in the no operation state (state S1) as shown in FIG. 14, the timer T1 is cancelled (processing (4)). In this case, a column in the next state is blank and the state is not changed, therefore, the state of the state S1 is maintained as it is.

When the touch-off operation notification (B) is made in the state S2 (gesture waiting state) as shown in FIG. 4, the timer 1 is cancelled and the timer T2 for double-tap determination is activated, then, the process proceeds to the state S6 (double-tap waiting state) (processing (5)). When the drag operation notification (C) is made in the state S2 (gesture waiting state) as shown in FIG. 5, drag scrolling is executed on condition that the moving amount is x-dot or more in the non-constrained mode and two fingers are not touched. Further, the timer T1 is cancelled and the process proceeds to the state S3 (drag scroll state) (processing (6)). On the other hand, half scrolling is executed in a tracing direction on condition that the moving amount is x-dot or more in the constrained mode and the two fingers are not touched. The timer T1 is cancelled in this case, and the process proceeds to the state S1 (no operation state) (processing (7)).

When the flick operation notification (D) is made in the state S2 (gesture waiting state) as shown in FIG. 6, the flick scroll is executed on condition that the moving amount is x-dot or more in the non-constrained mode and two fingers are not touched. Further, the timer T1 is cancelled, and the process proceeds to the state S4 (flick scroll state) (processing (8)). On the other hand, half scrolling is executed in the tracing direction on condition that the moving amount is x-dot or more in the constrained mode and the two fingers are not touched. The timer T1 is cancelled in this case, and the process proceeds to the state S1 (no operation state) (processing (9)).

When the pinch-out operation notification (H) is made in the state S2 (gesture waiting state) as shown in FIG. 10, the scale is changed (expanded) on condition that the moving amount is y-dot or more or an integrated moving amount is z-dot or more in the non-constrained mode. Further, the timer T1 is cancelled, and the process proceeds to the state S7 (pinch-in/out state) (processing (10)). Further, when the moving amount is y-dot or less in the non-constrained mode, the timer T is cancelled and the moving amount is integrated (processing (11)). The processing is not executed in the constrained mode (processing (12)).

When the pinch-in operation notification (I) is made in the state S2 (gesture waiting state) as shown in FIG. 11, the scale is changed (contracted) on condition that the moving amount is y-dot or more or the integrated moving amount is z-dot or more in the non-constrained mode. The timer T1 is cancelled and the process proceeds to the state S7 (pinch-in/out state) (processing (13)). Further, when the moving amount is y-dot or less in the non-constrained mode, the timer T1 is cancelled and the moving amount is integrated (processing (14)). The processing is not executed in the constrained mode (processing (15)).

When the swipe operation notification (J) is made in the state S2 (gesture waiting state) as shown in FIG. 12, the 3D dip angle is adjusted on condition that the moving amount is a-dot or more or the integrated moving amount is b-dot or more in the 3D dip angle adjustment screen. In addition, the timer T1 is cancelled and the process proceeds to the state S8 (swipe operation state) (processing (16)). On the other hand, when the moving amount is a-dot or less, the timer T1 is cancelled and the moving amount is integrated (processing (17)).

When the timer T1 count notification (M) is made in the state S2 (gesture waiting state) as shown in FIG. 14, continuous scroll is executed on condition that two fingers are not touched in the non-constrained mode. In addition, the timer T1 is cancelled and the process proceeds to the state S5 (continuous scroll operation state) (processing (18)). On the other hand, one-touch scroll is executed on condition that two fingers are not touched in the constrained mode. In this case, the timer T1 is cancelled and the process proceeds to step S1 (no operation state) (processing (19)).

Returning to FIG. 4, when the touch-off operation notification (B) is made in the state S3 (drag scroll state), the process proceeds to step S1 (no operation state) (processing (20)). When the drag operation notification (C) is made in the state S3 (drag scroll state) as shown in FIG. 5, drag scrolling is executed (processing (21)) on condition that the device is in the non-constrained mode. On the other hand, half scrolling is executed in the tracing direction when the device is in the constrained mode, and the process proceeds to the state S1 (no operation state) (processing (22)).

When the flick operation notification (D) is made in the state S3 (drag scroll state) shown in FIG. 6, flick scrolling is executed. Then, when the flick scrolling succeeds, the process proceeds to the state S4 (flick scroll state) (processing (23)). On the other hand, when the flick scroll fails, the process proceeds to the state S1 (no operation state) (processing (24)). When the constrained mode notification (K) is made in the state S3 (drag scroll state) as shown in FIG. 13, the process proceeds to the state S1 (no operation state) (processing (25)).

Returning to FIG. 3, when the touch-on operation notification (A) is made in the state S4 (flick scroll state), flick scrolling is cancelled (processing (26)). When the momentum scrolling stop notification (E) is made in the state S4 (flick scroll state) as shown in FIG. 7, the process proceeds to the state S1 (no operation state) (processing (27)). When the constrained mode notification (K) is made in the state S4 (flick scroll state) as shown in FIG. 13, the process proceeds to the state S1 (no operation state) (processing (28)) after cancelling flick scrolling.

Returning to FIG. 4, when the touch-off operation notification (B) is made in the state S5 (continuous scroll operation state), the continuous scrolling is stopped and the process proceeds to the state S1 (no operation state) (processing (29)). When the drag operation notification (C) is made in the state S5 (continuous scroll operation state) as shown in FIG. 5, continuous scrolling is executed based on new coordinates on condition that the device is in the non-constrained mode. However, no operation is performed when the notified coordinates are the same (processing (30)). On the other hand, one-touch scrolling is executed in the constrained mode, and the process proceeds to the state S1 (no operation state) (processing (31)). When the timer T1 count notification (M) is made in the state S5 (continuous scroll operation state) as shown in FIG. 14, the timer T1 is cancelled (processing (32)).

Returning to FIG. 3, when the touch-on operation notification (A) is made in the state S6 (double-tap waiting state), touch coordinates 2 are stored (processing (33)). When the touch-off operation notification (B) is made in the state S6 (double-tap waiting state), one-touch scrolling to a point of the touch coordinates 2 is performed, the timer T2 (double-tap determination) is cancelled when the timer T2 is activated, and the process proceeds to the state S1 (no operation state) (processing (34)).

When the double-tap operation notification (F) is made in the state S6 (double-tap waiting state) as shown in FIG. 8, the scale is changed (expanded), the timer T2 is cancelled and the process proceeds to the state S1 (no operation state) (processing (35)). When the two-finger double tap operation notification (G) is made in the state S6 (double-tap waiting state) as shown in FIG. 9, the scale is changed (contracted), the timer T2 is cancelled and the process proceeds to the state S1 (no operation state) (processing (36)). When the timer T2 count notification (N) is made in the state S6 (double-tap waiting state) as shown in FIG. 15, one-touch scrolling to a point of the touch coordinates 1 is executed. In addition, the timer T2 is cancelled and the process proceeds to the state S1 (no operation state) (processing (37)).

Returning to FIG. 4, when the touch-off operation notification (B) is made in the state S7 (pinch-in/out state), the process proceeds to the state S1 (no operation state) (processing (38)). When the pinch-out operation notification (H) is made in the state S7 (pinch-in/out state) as shown in FIG. 10, the scale is changed (expanded) on condition that the device is in the non-constrained mode (processing (39)). When the device is in the constrained mode, the process proceeds to the state S1 (no operation state) (processing (40)). When the pinch-in operation notification (I) is made in the state S7 (pinch-in/out state) as shown in FIG. 11, the scale is changed (contracted) (processing (41)) on condition that the device is in the non-constrained mode. When the device is in the constrained mode, the process proceeds to the state S1 (no operation state) (processing (42)).

Returning to FIG. 4, when the touch-off operation notification (B) is made in the state S8 (swipe state), the process proceeds to the state S1 (no operation state (processing (43)). When the swipe operation notification (J) is made in the state S8 (swipe state) as shown in FIG. 12, the 3D dip angle is adjusted (processing (44)).

As described above, the gesture microcomputer 16 detects the gesture of the user with respect to the touch panel 11 and notifies the HMI application 17 of the operation signal corresponding to the detection. The HMI application 17 determines the operation event based on the operation signal notified by the gesture microcomputer 16. The notification is received in such a way that the present state of the touch panel 11is judged and the determination is made based on variation of the state and the like by monitoring the state. The management of the state can effectively exclude the operation event which has been notified by the user unintentionally and enables determination of the operation event intended by the user.

In the above case, an event performed when the user starts the gesture operation of the touch panel 11 and an event performed when the user discards the gesture operation are made to be interpreted explicitly, and a gesture event generated (ignited) between these events can be excluded by the HMI application 17. Basically, the first gesture operation generated after the touch-on event operation is determined as the operation intended by the user, and processing is restricted until the touch-off event is generated after that even when receiving other operation events to thereby process only the operation event intended by the user in the present embodiment. Furthermore, false detection of the first gesture operation in the above case is restricted in the manner described below.

That is, first, the operation event is generated when the touch coordinates are moved only one dot in related art even when the user performs touch operation without moving a finger, whereas the operation is excluded with respect to such small action in the embodiment. In the case of a peculiar operation which is difficult to be processed in the first operation, namely, for example, in the double-tap operation, touch-on and double-touch on are notified after notifications of touch-on and touch-off, then, the touch-off is notified in related art. In the embodiment, the timer T2 is set in the first notification of touch-off, and processing is executed after waiting for the notification of the double tap-on operation within the timer T2 period. In the case of make a transition from the drag operation to the flick operation as a peculiar operation, exclusion processing can be executed in the same manner.

Furthermore, in related art, the event of two-finger operation and the event of one-finger operation may be notified almost at the same time when the user performs the two-finger operation, and the operation not intended by the user may be received to be an incorrect action depending on a finger touch. In response to this, the operation not intended by the user can be excluded by giving priority to the two-finger operation in the embodiment.

The touch panel operation device 3 and the operation event determination method according to the embodiment described above are configured to judge the present state of the touch panel 11 from the operation signal notified from the gesture microcomputer 16 and to determine the operation event by monitoring variation of the state, therefore, multiple kinds of operation events with respect to the touch panel 11 can be recognized with sufficient assurance, and execution of processing not intended by the user can be effectively restricted.

In addition, the function of the determination unit is not imparted to the gesture microcomputer 16 but can be realized by the software configuration (HMI application 17) on the controller 4 side which performs display control of the display device 7 in the embodiment. Accordingly, system design and adjustment, alternation and improvement of operational specification and the like can be accomplished on software without changing the gesture microcomputer 16, thereby obtaining an advantage that the adjustment, alternations and the like can be performed easily.

Although the present disclosure is applied to the control of the map display device in the car navigation system in the above embodiment, the present disclosure is not limited to this, and can be applied to the control of various types of operation targets in various types of devices such as operation control of a smart phone and a tablet terminal. In addition, the gesture operations by fingers on the touch panel has been described in the above embodiment, however, the present disclosure can be also applied to operations by the touch pen. Furthermore, the method of determining the operation event can be executed with appropriate alterations within a scope not departing from the gist of the present disclosure, for example, only part of the determination method in the embodiment may be applied.

What is claimed is:

1. A touch panel operation device capable of inputting multiple kinds of operation events according to gestures performed by a user using a finger or a touch pen on a touch panel, and executing control corresponding to the operation event to an operation target, the touch panel operation device comprising:
    a gesture microcomputer detecting a gesture with respect to the touch panel and a position thereof to output an operation signal; and
    a determination unit determining the operation event from the operation signal notified by the gesture microcomputer, wherein
    the determination unit judges a present state of the touch panel from the operation signal and determines the operation event by monitoring variation of the state,
    the determination unit becomes in a gesture waiting state when an operation signal of a first touch-on event is notified from the gesture microcomputer in a no operation state of the touch panel, and determines a first gesture of an operation signal notified from the gesture microcomputer in the gesture waiting state after the operation signal of the first touch-on event as an operation event intended by the user; and
    until a touch-off event is generated after the first gesture, the determination unit allows processing of only the operation event intended by the user and restricts processing of other operation events.

2. The touch panel operation device according to claim 1, wherein
    the gesture includes a drag operation, and
    the determination unit determines the operation event as the drag operation when an operation signal of the drag operation is notified from the gesture microcomputer on condition that a moving amount of a touch position is a predetermined value or more.

3. The touch panel operation device according to claim 1, wherein
    the gesture includes a flick operation, and
    the determination unit determines the operation event as the flick operation when an operation signal of the flick operation is notified from the gesture microcomputer on condition that the moving amount of the touch position is a predetermined value or more.

4. The touch panel operation device according to claim 1, wherein
    the gesture includes a double-tap operation, and
    the determination unit set a timer when an operation signal of touch-off is notified from the gesture microcomputer after the operation signal of a first touch-on, and determines the operation event as the double-tap operation on condition that an operation signal of the double-tap operation is notified from the gesture microcomputer within a timer period.

5. The touch panel operation device according to claim 4, wherein
    the determination unit determines the operation event as a tap operation when the timer period elapses.

6. The touch panel operation device according to claim 1, wherein
    the gesture includes a two-finger operation performed by touching two places almost at the same time, and
    the determination unit makes a determination by giving priority to the operation event of the two-finger operation over the operation event of one-finger operation when the operation signal of the two-finger operation is notified from the gesture microcomputer.

7. The touch panel operation device according to claim 1, wherein
    the operation target is a map display device, and
    the display control of the map display device is executed in accordance with the operation event determined by the determination unit.

8. The touch panel operation device according to claim 1, wherein
    the touch panel operation device is equipped to a vehicle, and
    the operation of the touch panel is restricted when the vehicle travels.

9. An operation event determination method for determining an operation event in a touch panel operation device which includes a touch panel on which multiple kinds of operation events can be inputted according to gestures performed by a user using a finger or a touch pen, a gesture microcomputer detecting a gesture with respect to the touch panel and a position thereof to output an operation signal, and a determination unit for determining the operation event from the operation signal notified from the gesture microcomputer and which performs control corresponding to the operation event to an operation target, the operation event determination method comprising:
    judging a present state of the touch panel from the operation signal notified by the gesture microcomputer, and
    determining the operation event by monitoring variation of the state,
    wherein the determination unit becomes in a gesture waiting state when an operation signal of a first touch-on event is notified from the gesture microcomputer in a no operation state of the touch panel,
    the method further comprising:
    determining, with the determination unit, a first gesture of an operation signal notified from the gesture microcomputer in the gesture waiting state after the operation signal of the first touch-on event as an operation event intended by the user; and
    allowing, with the determination unit, only the operation event intended by the user and restricts processing of other operation events until a touch-off event is generated after the first gesture, the determination unit allows processing.

* * * * *